United States Patent Office.

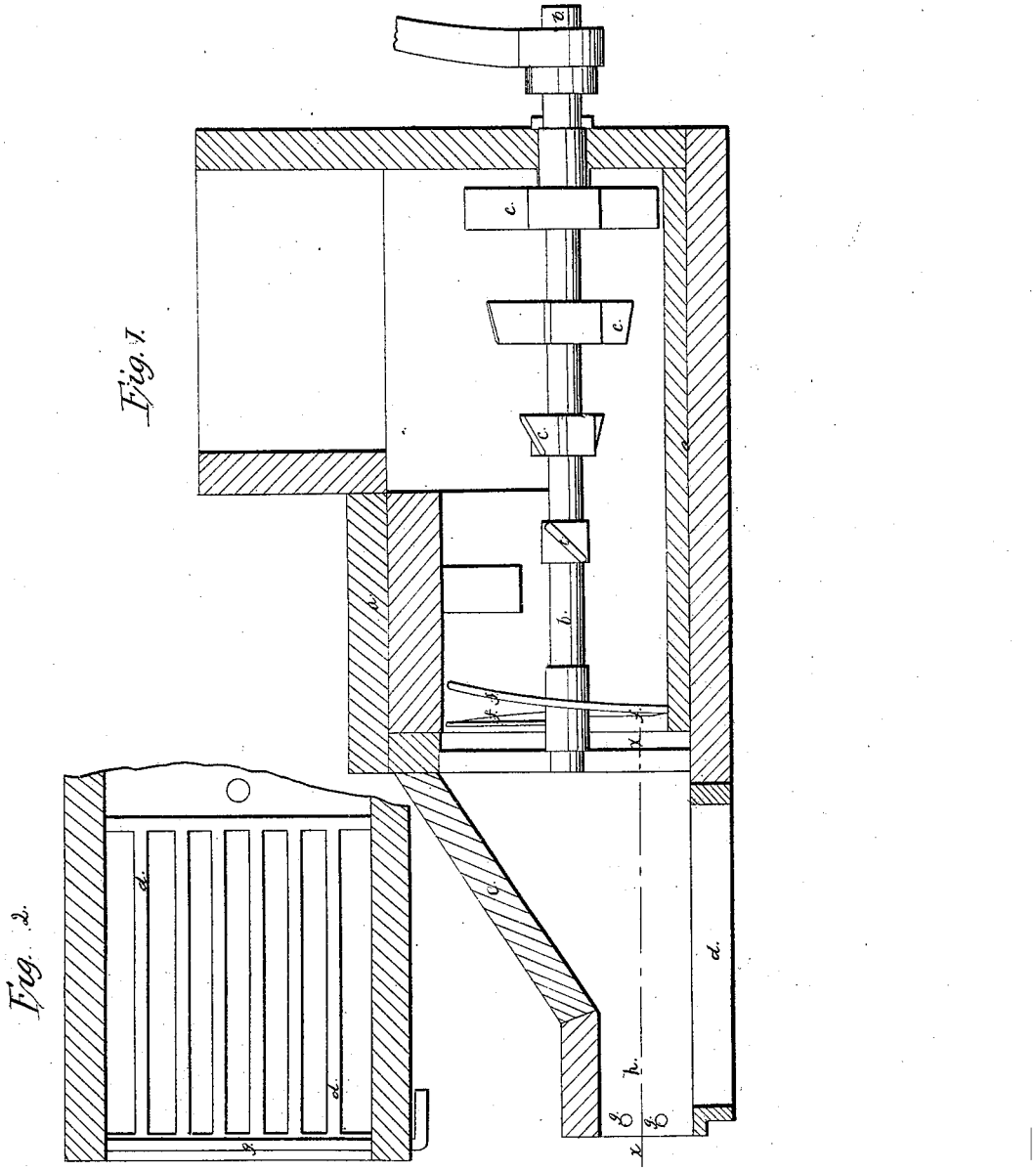

DARIUS WELLINGTON, OF BOSTON, MASSACHUSETTS.

*Letters Patent No. 81,314, dated August 18, 1868.*

IMPROVED MACHINE FOR SEPARATING STONES FROM CLAY.

*The Schedule referred to in these Letters Patent and making part of the same.*

TO ALL WHOM IT MAY CONCERN:

Be it known that I, DARIUS WELLINGTON, of Boston, in the county of Suffolk, and State of Massachusetts, have invented an Improved Machine for Separating Stones from Clay; and I do hereby declare that the following, taken in connection with the drawings which accompany and form part of this specification, is a description of my invention sufficient to enable those skilled in the art to practise it.

In preparing clay to be moulded and burnt, to form bricks, it is very desirable, while working or grinding the clay to make it homogeneous, to separate from the plastic substance the stones or pebbles which are often found in considerable numbers in beds of clay, such separation being at all times a matter of importance, as affecting the quality of the brick produced, and being especially important in those cases where the clay is to be moulded into form by machinery, as the presence of stones in the clay is the cause of a large part of the breakage which occurs in brick-moulding machines.

Of the drawings, which represent a machine which embodies my invention—

Figure 1 is a longitudinal section, and

Figure 2 is a section of a part of the machine, taken on the line $x$ $x$, seen in fig. 1, and showing in the plan the grate through which the wrought clay escapes.

In a close, stout box, $a$, having an open hopper-mouth, into which rough clay can be thrown, is a shaft, $b$, provided with arms, $c$, which act to reduce the clay from a lumpy condition, said arms having their blades set angularly, so as to move the clay onward from the point of entry toward the point of delivery.

On the end of said shaft $b$ there is fixed a screw, $f$, which operates on the reduced clay to feed it forward, or to press it into a chamber which is located beyond, and which has at the bottom a grate, $d$, the openings in which are of such size as to permit the wrought clay to pass through, but which will not permit the passage of stones of such size as may be injurious to the bricks or the brick-making machinery.

The top of this chamber, over the grate $d$, is marked $e$, and is inclined in such a manner that the clay is deflected by it upon the grate, so that the action of the screw-blade $f$ operates to force the clay downward as well as onward, the stones which are in the clay being forced forward in the body of the clay and on the surface of the grate to a kind of pocket, $h$, beyond the inclined top $a$, in which pocket the top is parallel with the surface of the grate, so that in said pocket there is no special downward pressure.

The part of this pocket where the stones collect is provided with movable bars, placed at distances apart about equal to the spaces between the grates, so that any clay which is carried forward with the stones may escape past the bars which are marked $g$.

These bars are made movable, so that when a considerable quantity of stones has collected in the pocket, one or more of the bars $g$ may be removed, and the stones can be taken out of the pocket.

I claim, in a clay-mill, the arrangement of the parts, substantially as herein described; that is to say, arranging the delivery-grate $d$ beyond the shaft $b$, and these in relation to the incline $e$, so that the blades on said shaft shall cause a movement of the mass of clay over the grate and under the incline $e$, by which movement the clay is forced through the grate, and the stones moved forward thereon, and into the pocket $h$, which pocket is provided with movable bars $g$, or their equivalents.

DARIUS WELLINGTON.

Witnesses:
   J. B. CROSBY,
   FRANCIS GOULD.